United States Patent [19]

Sudoh et al.

[11] Patent Number: 5,191,430
[45] Date of Patent: Mar. 2, 1993

[54] PRINTING APPARATUS AND METHOD USING A RASTER BUFFER DIVIDED INTO A WRITING LAYER, A READING LAYER, AND A WRITE-WAITING LAYER FOR HANDLING DATA OVERFLOW

[75] Inventors: Eisho Sudoh; Masahiro Suzuki, both of Tokyo, Japan

[73] Assignee: Oki Electric Industry Co., Ltd., Tokyo, Japan

[21] Appl. No.: 698,384

[22] Filed: May 10, 1991

[30] Foreign Application Priority Data

May 22, 1990 [JP] Japan .................................. 2-130391

[51] Int. Cl.⁵ .............................................. H04N 1/21
[52] U.S. Cl. .................... 358/296; 358/404; 358/444; 395/115
[58] Field of Search ............. 358/296, 404, 444; 359/110, 115

[56] References Cited

U.S. PATENT DOCUMENTS

4,805,094  2/1989  Oye et al. .............................. 395/250
5,046,039  9/1991  Ugajin et al. .......................... 395/250

Primary Examiner—Benjamin R. Fuller
Assistant Examiner—Scott A. Rogers
Attorney, Agent, or Firm—Spencer, Frank & Schneider

[57] ABSTRACT

In a printing apparatus, a raster buffer for storing dot image data is divided into three layers in the direction of auxiliary scanning, and the respective layers are assigned to a writing layer in which a font pattern read from a font memory is written, a reading layer from which dot image data that have been written are read, and a write-waiting layer in which a font pattern that has overflown the writing layer is written, with the writing layer and the write-waiting layer having a capacity for storing a character having the biggest size among those which are used frequently. Prior to printing of dot image data, a font pattern is written in the writing layer, and the definition of the layer in which writing has been made is changed to a reading layer, dot image data is then read from the reading layer, the definition of the write-waiting layer waiting for the next writing is changed to a writing layer, and the definition of the reading layer from which the reading has been made is changed to a write-waiting layer, with such change of definition being made successively.

14 Claims, 10 Drawing Sheets

PRINTING APPARATUS AND METHOD USING A RASTER BUFFER DIVIDED INTO A WRITING LAYER, A READING LAYER, AND A WRITE-WAITING LAYER FOR HANDLING DATA OVERFLOW

FIELD OF THE INVENTION

The present invention relates to a printing apparatus capable of printing a page at a time.

BACKGROUND OF THE INVENTION

In conventional electrophotographic printer, a photosensitive drum that has been charged is irradiated with a light source to form an electrostatic latent image, toner is made to adhere to the electrostatic latent image for development, and the toner image is transferred to a recording medium.

The electrophotographic printer is capable of printing a page at a time, so that it can be used as a page printer.

Figure 10:
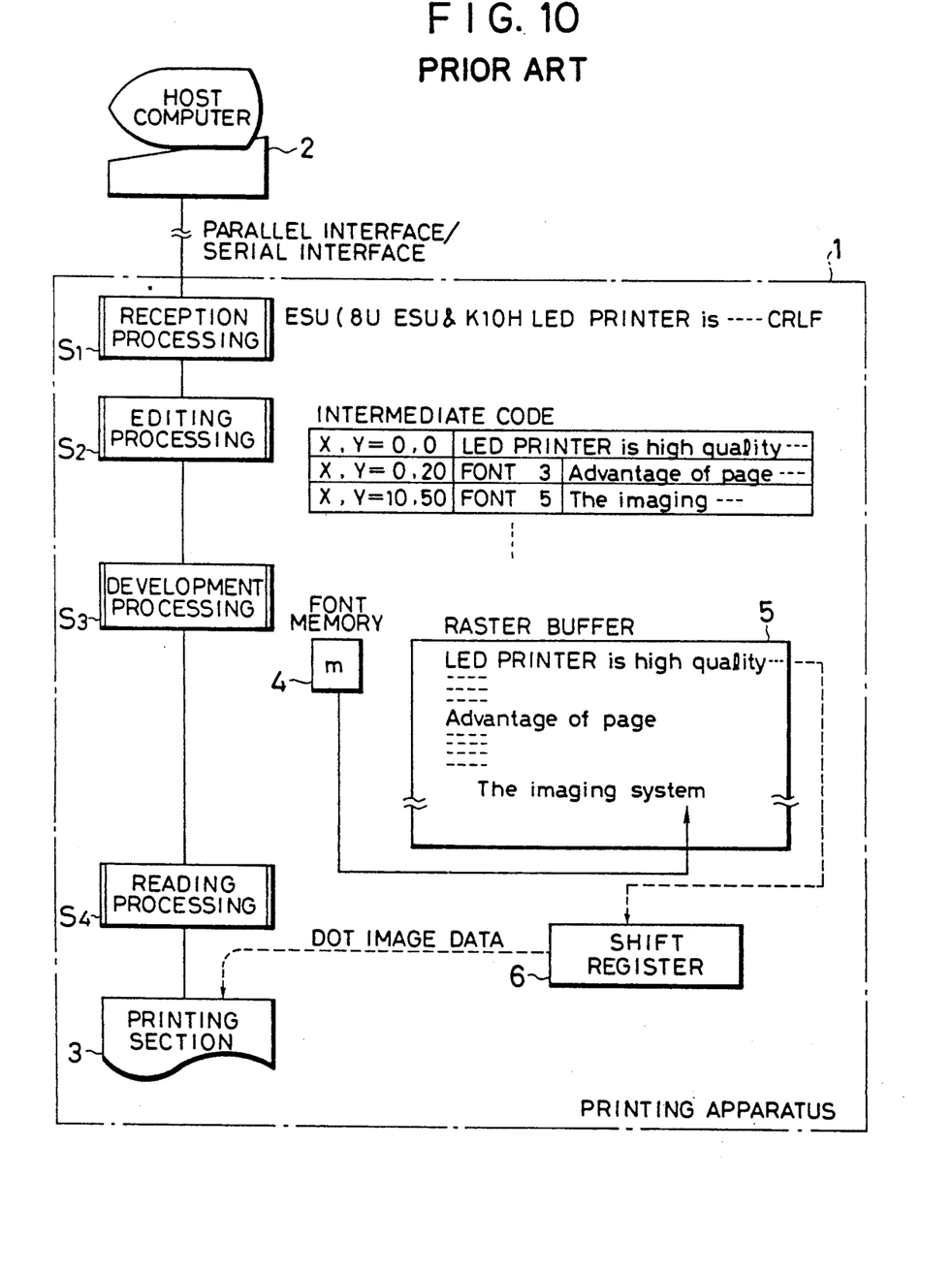
FIG. 10 is a schematic diagram of a conventional printing apparatus.

FIG. 10 is a functional block diagram showing a conventional printing apparatus of this type.

As illustrated, a host computer 2 is connected to a printing apparatus 1 via a parallel interface or a serial interface, generating print data, and supplying the print data to the printing apparatus 1.

When the print data is supplied from the host computer 2, the printing apparatus 1 performs reception processing (step S1), editing processing (step S2), development processing (step S3), and reading processing (step S4), to produce dot image data, and sends the dot image data to the printing section 3 of the electrophotographic printing system.

In the reception processing S1, the print data that have been received are in the form code data such as "ESC(8U" (signifying designation of symbol set Roman-8); "ESC & K10H" (signifying character pitch 10 characters per inch); "LED PRINTER IS" (character series); ... "CR LR" (signifying carriage return and line feed). These data are stored in a reception buffer, not shown.

In the editing processing S2, the code data that are stored in the reception buffer are read out and converted into intermediate codes, and arrangement is made, e.g., as shown in the figure, a character code series "LED PRINTER is high quality ... " starts at the point (x=0, y=0), Y=0-th dot, another character series "Advantages of page ... " starts at the point x=0, y=20), and a further character series starts at the point (x=10, y=50). In addition, the sizes and typefaces of the print characters are designated by Font=3 or Font=5.

In other words, the editing is due so as to facilitate development into bit-map data in the subsequent development processing step S3, and the edited data are stored in a page memory, not shown.

In the development processing S3, designated font patterns are read from a font memory 4 in accordance with the intermediate codes in the page memory, and written into the designated locations in a raster buffer 5.

In the reading processing S4, the dot pattern data having been written in the raster buffer 5 are read by raster scan, and converted by a shift register 6 from parallel data into serial data, and the data are then sent to the printing section 3. The raster buffer 5 has a memory capacity for printout of one page, e.g., about 1 Mbytes in the case of a page of letter size with a density of 300 dots per inch. The raster buffer 5 is either of the full-page buffer type in which reading is effected after development of data of one entire page is completed, or of the band-buffer type in which the limited memory capacity is divided into an area for dot pattern development and an area for reading, and these areas are used alternately for development and reading of one page.

In the above conventional printing apparatus of the full-page buffer type, memory capacity for one page is needed, so the memory capacity required is large. This increases the cost of the printing apparatus, particularly of those having a higher print dot density.

In the case of the band-buffer type, when it is necessary to write a dot pattern at the border of the raster buffer 5, part of the dot pattern 5 that has overflown the page must be written again in the next cycle. This will impose a limitation to increasing the writing speed. Where complicated patterns and a multiplicity of character patterns are concentrated in a specific region, the writing of the dot patterns is slower than the printing.

SUMMARY OF THE INVENTION

The present invention aims at solving the above problems, and providing a printing apparatus in which the cost increase due to the memory capacity for one page is avoided, it is not necessary to repeat the writing at the border of the raster buffer, it is possible to increase the printing speed, and the writing of dot patterns is not slower than the printing even when complicated patterns and a multiplicity of character patterns are concentrated in a specific region.

In the printing apparatus according to the invention, a raster buffer for storing dot image data is divided into three layers in the direction of auxiliary scanning. The respective layers are assigned to a writing layer in which font patterns read from a font memory are written, a reading layer from which dot image data that have been written are read, and a write-waiting layer in which those parts of font patterns that have overflown the writing layer are written.

The writing layer and the write-waiting layer have a capacity for storing a character having the biggest size among those which are used frequently, e.g., a character of 12 points or greater size.

Prior to printing of dot image data, font patterns are written in the writing layer and write waiting layer, and the definition of the layer which has been the writing layer is changed to a reading layer. Dot image data are then read from the reading layer, the definition of the write-waiting layer waiting for the next writing is changed to a writing layer, and the definition of the reading layer from which the reading has been made is changed to a writing layer, with such change of definition being made successively.

The memory capacity of the writing layer, the reading layer, and the write-waiting layer may be identical. Alternatively, each of the layers may be divided into a plurality of sections, and the sections may have identical memory capacity.

There may be provided a raster buffer for storing dot image data, means for reading a font pattern from a font memory and writing the font pattern in the raster buffer, means for reading the written dot image data from the raster buffer, and means for locating, when the font pattern exceeds the border at the tail of the raster buffer at the time of writing, the exceeding part at the head of the raster buffer, with continuity. In this case, there are provided storage means for storing data setting the size of the raster buffer for storing the dot image data, storage means for storing data positioning the raster buffer in the memory space of a microprocessor, a counter for accessing the raster buffer, and means for automatically connecting the dot line address at the tail of the raster buffer and the dot line address at the head of the raster buffer.

According to the invention, the raster buffer for storing dot image data is divided into three layers in the direction of auxiliary scanning, and the respective layers are assigned to a writing layer in which a font pattern read from a font memory is written, a reading layer from which dot image data that have been written are read, and a write-waiting layer in which part of a font pattern that has overflown the writing layer is written. As a result, functions similar to the case with a memory capacity of one page is obtained with a smaller memory capacity within either the writing layer or the write-waiting layer.

The writing layer and the write-waiting layer have a capacity for storing a character having the biggest size among those which are used frequently, e.g., a character of 12 points or greater size. As a result, the entirety of the font pattern can be written.

Prior to printing of dot image data, a font pattern is written in the writing layer, and the definition of the layer in which writing has been made is changed to a reading layer, dot image data is then read from the reading layer, the definition of the write-waiting layer waiting for the next writing is changed to a writing layer, and the definition of the reading layer from which the reading has been made is changed to a writing layer, with such change of definition being made successively. As a result, by repeating the change of a definition, the writing layer of small memory capacity can be utilized efficiently.

Moreover, there are provided a raster buffer for storing dot image data, means for reading a font pattern from a font memory and writing the font pattern in the raster buffer, means for reading the written dot image data from the raster buffer, and means for locating, when the font pattern exceeds the border at the tail of the raster buffer at the time of writing, the exceeding part at the head of the raster buffer, with continuity. As a result, the exceeding font pattern need not be written again in the next cycle.

DETAILED DESCRIPTION OF THE PREFERRED EMBODIMENTS

Embodiments of the invention will now be described with reference to the drawings.

Figure 1:
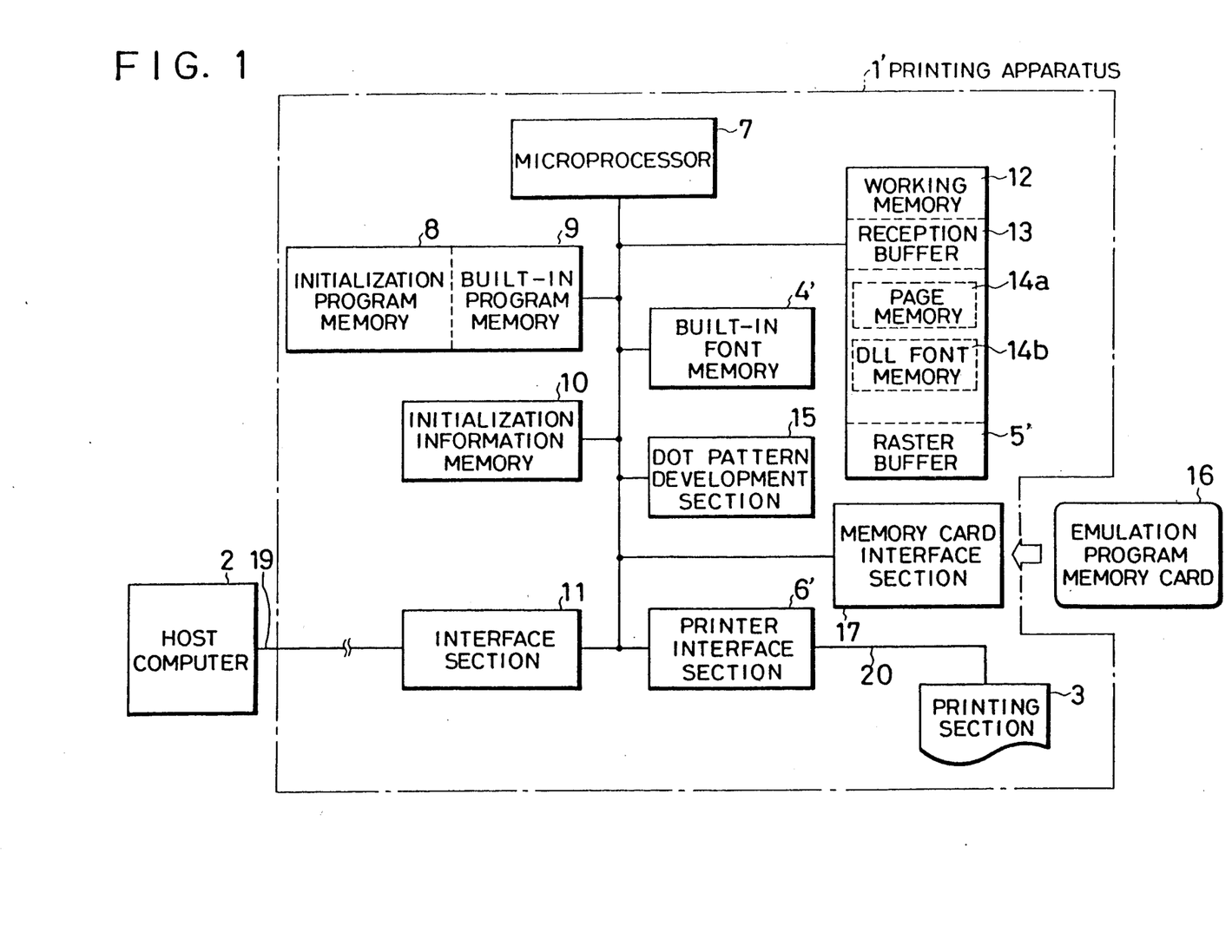
FIG. 1 is a block diagram showing a printing apparatus of an embodiment of the invention.

FIG. 1 is a block diagram showing an embodiment of the invention.

In the figure, a printing apparatus 1' and a host computer 2 are connected to each other. The printing apparatus comprises a printing section 3 of the electrophotographic printing system, and a microprocessor 7. A built-in initialization program memory 8 effects initialization and the like, a built-in program memory 9 is for performing control over the printing apparatus. An initialization information memory 10 comprises a non-volatile memory for storing user-designated information and the like. An interface section 11 is for data exchange with the host computer 2. There are further provided a working memory 12, a reception buffer 13 for temporarily storing print data and the like in the form of code data, a page memory 14a for storing print data that have been converted from the code data form into the intermediate code form and edited into a format of the printing paper, a DLL font memory 14b for storing down-line-loading fonts (DLL fonts) from the host computer or the like, and a dot pattern development section 15 for editing the print data in the intermediate code form stored in the page memory 14a into the dot image which is the format used for printing by the printing section 3. A raster buffer 5' is for storing dot image data obtained through editing by the dot pattern development section 15. A printer interface section 6' performs control over the reading of the dot image data from the raster buffer 5', control over data transfer to the printing section 3, and the like. A built-in font memory 4' stores font patterns which are used frequently. These font patterns are resident (stored at all times) as internal characters and in conformity with the print density. A memory card 16 stores various emulation programs which can be added as options. A memory interface section 17 connects the memory card 16. Microprocessor bus lines 18 comprise data bus signal lines, address signal lines, and control signal lines. Host interface signal lines 19 are of a serial interface, parallel interface, or the like. Printer interface signal lines 20 comprise a video interface for transfer of dot image data to the printing section 3 and a serial interface for communication with the printing section 3.

The operation of the printing apparatus of the above construction will now be described.

The printing apparatus 1' is reset into an initialized state immediately after power-on. The program stored in the initialization program memory 8 comprised of a ROM (read-only memory) is started to initialize hardware components. A RAM (random access memory) and the like are subjected to compare-checking by read/write. When they are found normal, user-designated information is read from the initialization information memory 10 and the application and the manner of use of the memories are defined, and "jump" is made to the emulation program, e.g., the program stored in the built-in program memory 9, and the control over the printing apparatus 1' is performed.

Prior to the reception of print data, special font patterns which are not resident (stored at all times) in the built-in font memory 4' are down-loaded from the host computer 2 via the interface section 11 and the reception buffer 13 into the DLL font memory 14b.

When the print data to be printed are sent from the host computer 2 via the interface section 11 to the reception buffer 13, the microprocessor 7 reads the print data in the code data form stored in the reception buffer 13, and converts them into the intermediate code form, edits the data in the format of the printing paper and stores the data in the page memory 14a. The print data reception processing and the editing processing are performed in parallel, and the editing of data for one page is thus completed.

The microprocessor 7 then reads, in accordance with the intermediate code in the page memory 14a, the designated font patterns from the built-in memory 4' or the DLL font memory 14b, and writes the pattern in the designated locations in the raster buffer 5'. In this way, the data are successively written in the raster buffer 5'. When the writing for a certain number of lines is completed, the printer interface section 6' reads, in parallel with the continued font pattern writing, the dot image data of the dot patterns and the like, by raster scanning, and transfers the data to the printing section 3 via the printer interface signal lines 20. This control operation is repeated for the data of one page.

Figure 2:
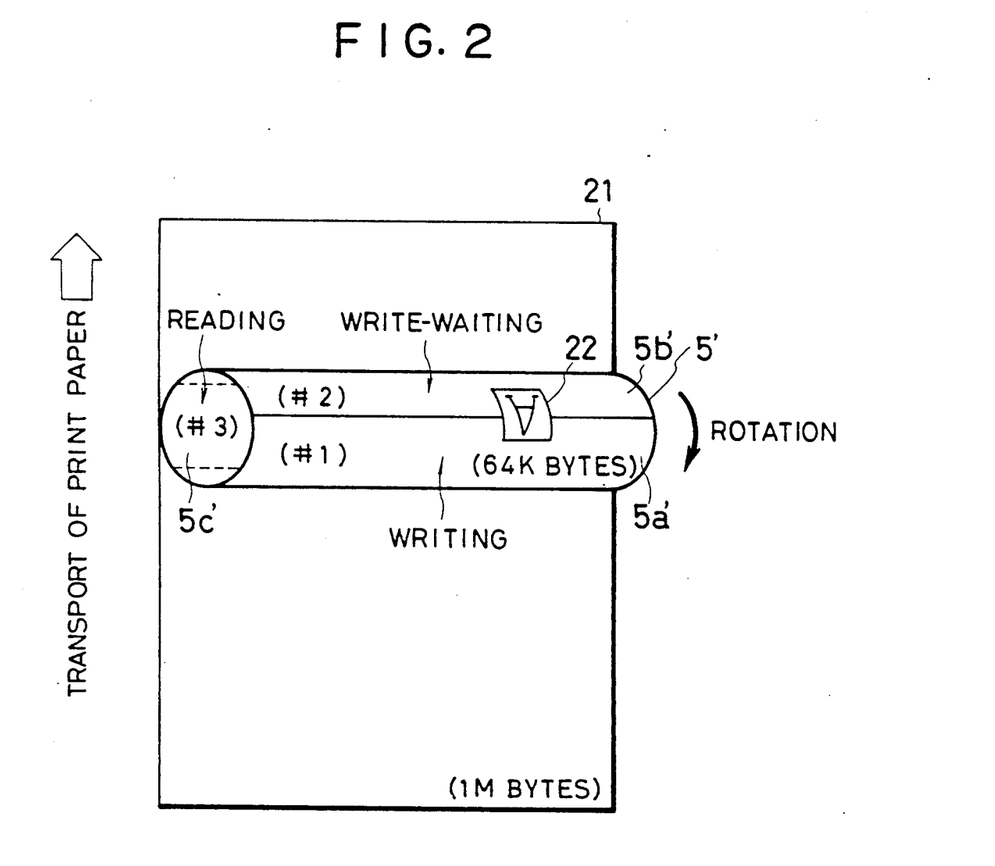
FIG. 2 is a schematic diagram of the raster buffer of the band buffer type according to an embodiment of the invention.

FIG. 2 is a schematic diagram of the raster buffer of the band-buffer type.

In the figure, 21 denotes a dot image memory for one page of printing paper. The raster buffer 5' has a configuration in which the address section can be accessed cyclically and, although its capacity is small (e.g., about 64 Kbytes), it functions as if it had a capacity of one page (about 1 Mbytes in the case of a printing paper of the letter size and a density of 300 dots per inch), by performing wrap control (control for the cyclic access). For the writing of the font patterns and for the reading of dot image data in the form of the printing paper image, the raster buffer 5' is divided into a writing layer, a write-waiting layer, and a reading layer. The reading speed, and the capacity of the raster buffer 5' and the number of division layers are so set as to prevent overrun in which the writing processing cannot follow the reading processing.

In order to print on a printing paper of the letter size (8.5 inches wide) with a print dot density of 300 dots per inch, the number of dots required in the direction of the principal scanning (the direction of scanning with a higher frequency) within one raster is $300 \times 8.5 = 2550$ dots. In consideration of skew during transport of the printing paper and ease of memory control, it is set to be 320 (which is a multiple of 8)$\times 8 = 2560$ ($>2550$). The number of dots in the direction of the auxiliary scanning (the direction of the scanning with the lower frequency) is set to be 64 dots which is a multiple of 8 for ease of memory control and to accommodate the font patterns used (e.g., in the case of characters of 12 points; $1/72 \times 12 \times 300 = 50$ dots).

The size of the layer is $64 \times 320$ bytes $= 20.48$ Kbytes. For three layers, 61.44 Kbytes are required. This can be accommodated in the 64 Kbytes.

Figure 3:
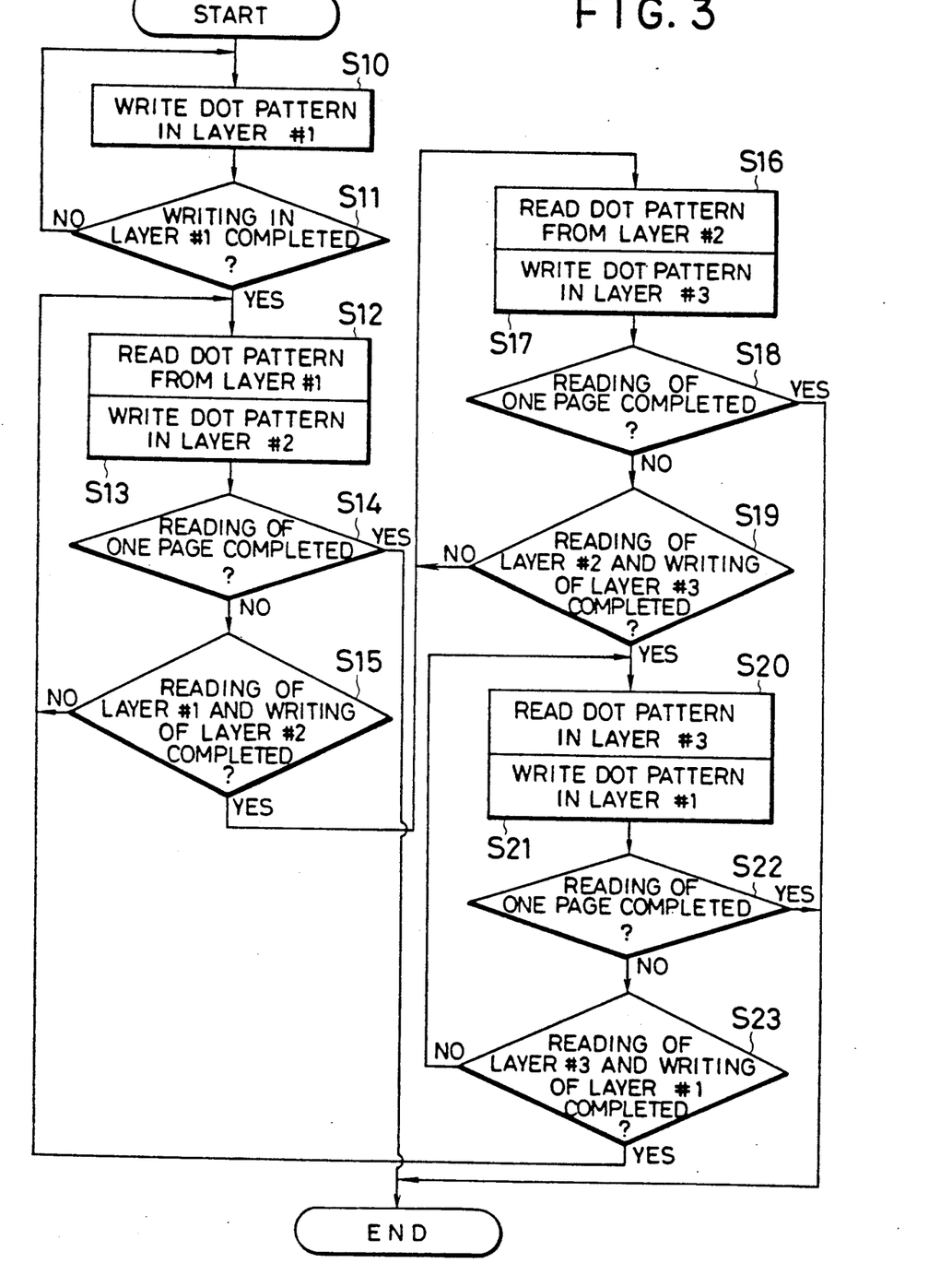
FIG. 3 is a flowchart showing the operation of the raster buffer according to an embodiment of the invention.

FIG. 3 is a flowchart showing the operation of the raster buffer.

It is assumed that the raster buffer 5' is divided into three layers, one layer for writing, one layer for write-waiting, and one layer for reading.

Step S10

The microprocessor 7 reads, in accordance with the print data in the intermediate code form in the page memory 14a that have been edited in the format of the printing paper, the designated font patterns 22 (FIG. 5) from the built-in font memory 4' or the DLL font memory 14b, and writes the patterns in the layer #1 5a' (defined as a writing layer) in the raster buffer 5'.

Steps S11, S12

The print data in the intermediate code form are edited in association with the layers of the raster buffer 5'. When reading of font patterns for the layer #1 5a' and writing in the raster buffer 5' are completed, the definition of the layer #1 5a' is changed to a reading layer, and reading of the dot image data written in the layer #1 5a', in the direction of the principal scanning (the direction vertical to the direction of transport of the printing paper) is started.

Step S13

The layer #2 5b' is defined as the writing layer, and reading of the above-mentioned font patterns and writing in the raster buffer 5' are started on the basis of the print data in the code form for the layer #2 5b'.

Steps S14 and S15

Judgements are made on whether reading of one page from the page memory has been completed, reading of the layer #1 has been completed, and writing in the layer #2 has been completed. The above steps S12 to S15 are repeated until the results of the judgments are all affirmative.

Steps S16 and S17

When reading of the dot image data from layer #1 5a', and writing of font patterns 22 into the layer #2 5b' have been completed, definition of the layer #2 5b' of the raster buffer 5' is changed from the writing layer to the reading layer, reading of the dot image data is started, and the layer #3 5c' is defined as the writing layer and reading of the font patterns 22 and writing in the raster buffer 5' are started on the basis of the print data of the code form for the layer #3 5c'. At the same time, the definition of the layer #1 5a' is changed from the reading layer to the writing layer. When the font patterns 2 to be stored in the writing layer overflow the layer #3 5c', the layer #1 5a' serves as an auxiliary layer for storing that part which has overflown.

Steps S18 and S19

Judgments are made on whether reading of one page from the page memory has been completed, reading of the layer #2 has been completed, and writing in the layer #3 has been completed. The above steps S16 to S19 are repeated until the results of the judgments are all affirmative.

Steps S20 and S21

When the reading of dot image data from the layer #2 5b' and the writing of the font patterns 22 into the layer #3 5c' are completed, the definition of the layer #3 5c' is changed from the writing layer to the reading layer, and the reading of the dot image data is started. The definition of the layer #1 5a' is changed from the write-waiting layer to the writing layer, and the reading of the font patterns 22 and the writing in the raster buffer 5' are started on the basis of the print data of the code form the layer #1 5a' which appears after one revolution of the raster buffer 5'. The definition of the layer #2 5b' is changed from the reading layer to the writing layer.

Steps S22 and S23

The above steps S20 to S23 are repeated until the reading of one page from the page memory is completed, the reading of the layer #3 is completed, and the writing in the layer #1 is completed. When the reading of dot image data from the layer #3 5c' and the writing of the font data 22 in the layer #1 5a' are completed, the next steps are the steps S12 and S13, and the definition of the layer #1 5a' is changed from the writing layer to the reading layer, the definition of he the layer #2 5b' is changed from the write-waiting layer to the writing layer, and the definition of the layer #3 5c' is changed from the reading layer to the write-waiting layer, and the reading of the dot image data and the writing of font patterns are performed. Subsequently, the steps S12 to S15 are repeated until it is found, at the steps S14 and S15, that the reading of one page is completed, the reading of the layer #1 is completed, and the writing of the layer #2 is completed.

When the reading of one page is completed by repeating the steps S12 to S15, S16 to S19, and S20 and S23, the reading of dot image data of one page and their printing is completed.

Figure 4:
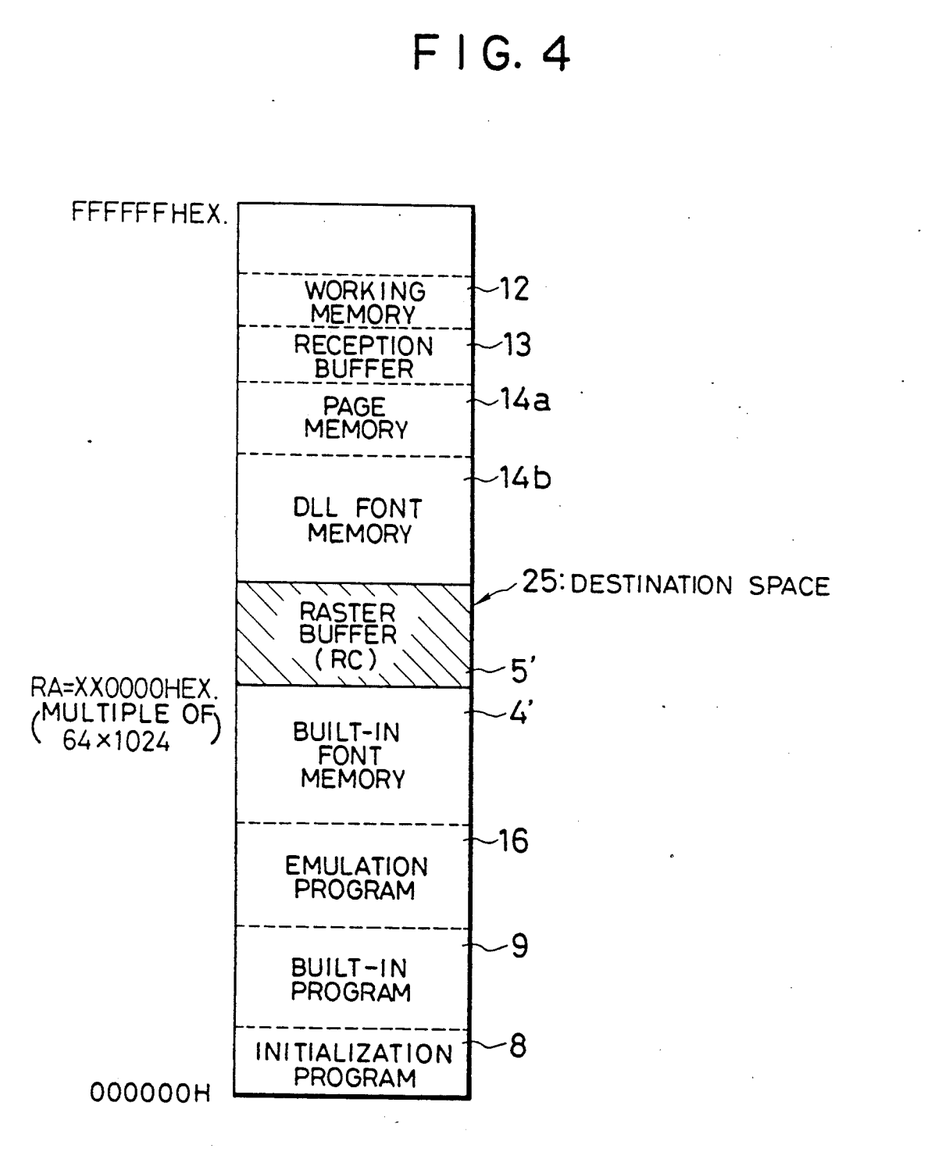
FIG. 4 is a diagram showing the memory layout of the printing apparatus according to an embodiment of the invention.
Figure 5:
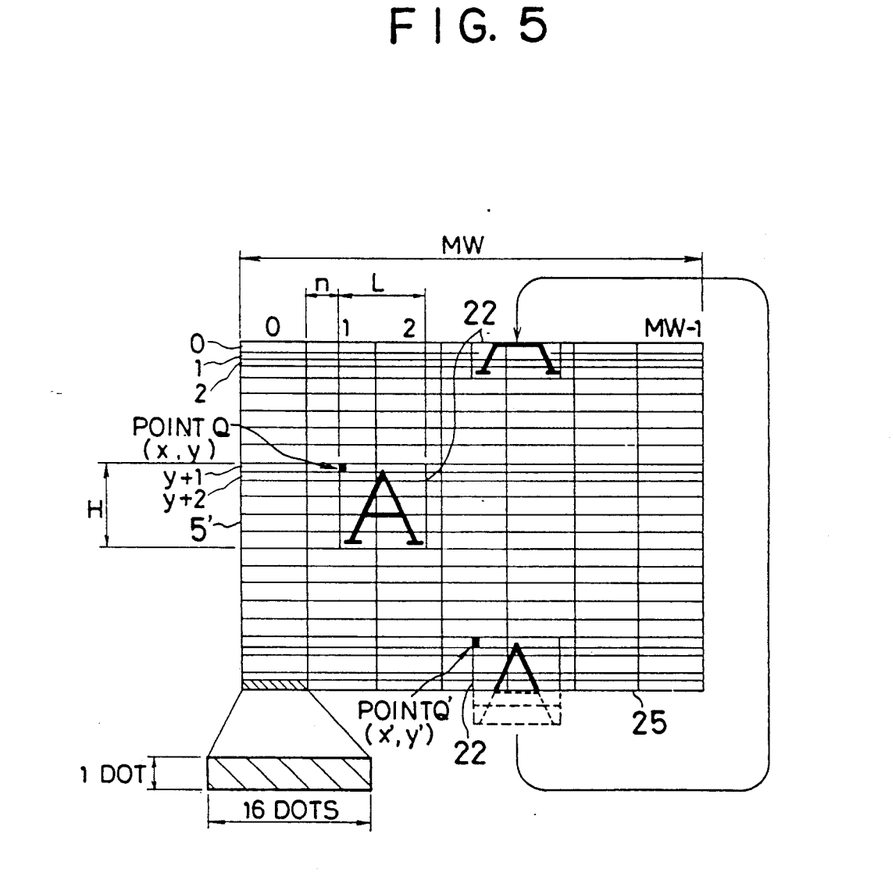
FIG. 5 is a diagram showing the details of the raster buffer in the printing apparatus according to the invention.

FIG. 4 shows a memory layout in the printing apparatus according to the invention, and FIG. 5 shows the details of the raster buffer of the printing apparatus according to the invention.

In the figure, the area to which the dot pattern development section 15 (FIG. 1) develops the dot patterns is called a destination space 25, and the raster buffer 5' is allocated in the destination space 25. The heading address (RA=xx0000 Hex.), with x=any one of 0 to F (in hexadecimal notation), of the destination space 25 (raster buffer 5') is a number which is a multiple of $64 \times K$ (K stands for 1024), preferably $2^n$ times $64 \times K$, and the capacity (the capacity RC of the raster buffer 5') is $2^n$ times the 64 Kbytes.

When the heading address RA and the capacity RC are set in the raster address register in the dot pattern development section 15, and the position of the destination space 25 is defined, the subsequent pointing within the destination space 25 is made with destination address, with bit boundary, i.e., to a particular bit.

To treat the destination space 25 as a two-dimensional space, the width of the destination space 25 in the principal scanning direction is defined in the destination memory width register (MW) with word boundary, i.e., with the stored value, also denoted by MW signifying the number of words per line, as shown in FIG. 5.

The destination space 25 is therefore defined as the space of:

16·MW dots in the principal scanning direction, and
$\frac{1}{2}$·RC/MW dots in the auxiliary scanning direction.

The destination address with which the pointing is made is normalized within the defined space.

When the destination space 25 is defined as a full-page buffer, the destination address of a point Q (x, y) in the destination space 25 is pointed by:

16·MW·y+x and, on an actual memory,

RA+2·MW·y+x/8 with modulus x/8. When the writing or destination address to a point Q' (x', y') is outside the destination space 25, the region outside the destination space 25 is normalized, and the development is made starting with the heading of the destination space 25. This applies also in the band buffer structure.

Figure 6:
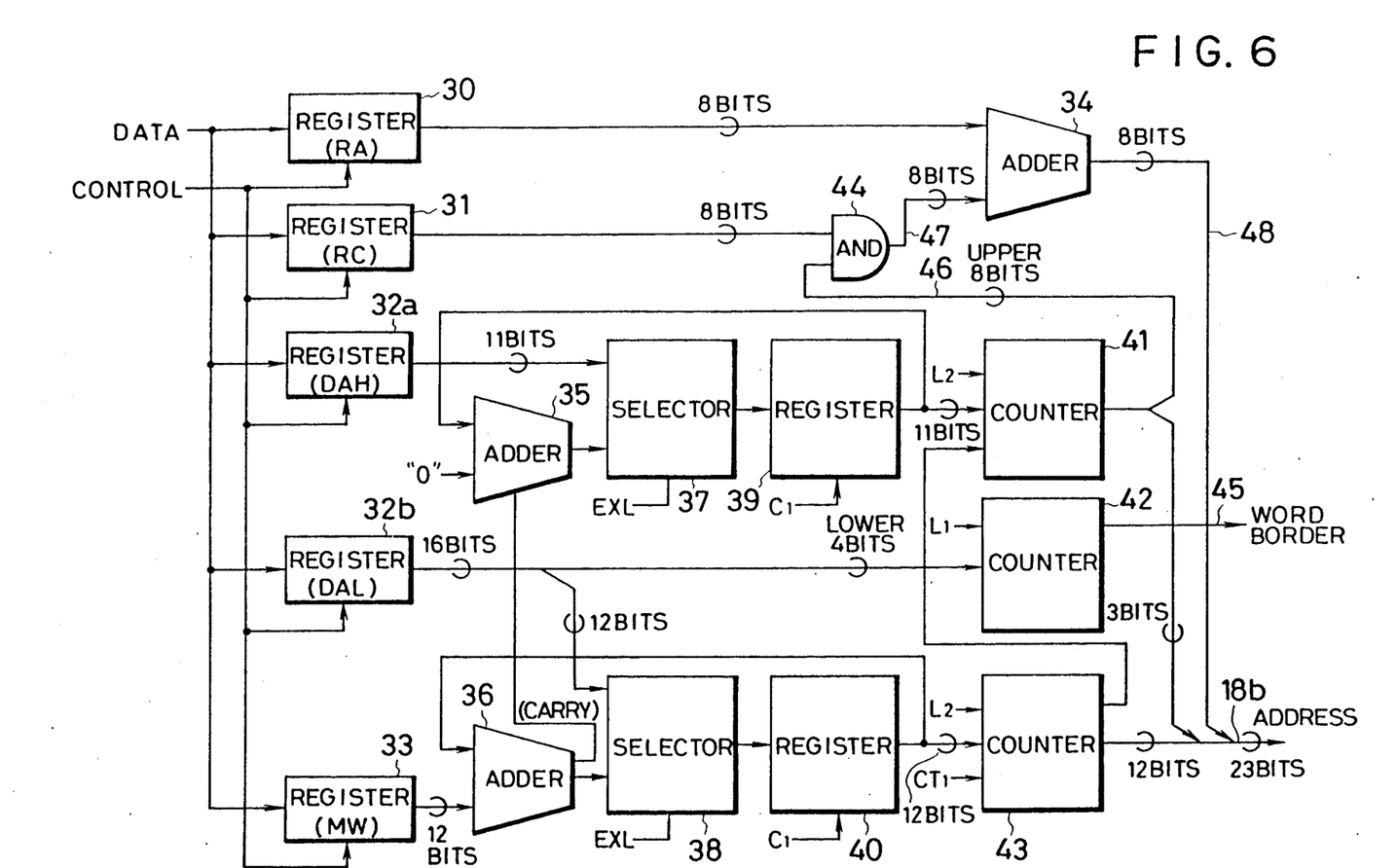
FIG. 6 is a diagram showing the dot pattern writing address circuit in the dot pattern development section.

FIG. 6 shows a dot pattern writing address generating circuit in the dot pattern development section 15. It can access a memory space of 16 Mbytes.

As illustrated, it comprises a register 30 for storing the heading address RA of the raster buffer 5', a register 31 for storing the memory capacity (space) RC of the raster buffer 5', registers 32a and 32b for storing destination address for the pointing to a particular bit within the destination space 25. A register 33 stores the number of words, MW, per line, i.e., within in the destination memory width MW. These data are set by the microprocessor 7.

The dot pattern development section 15 further comprises adders 34, 35 and 36, selectors 37 and 38, registers 39 and 40, counters 41, 42 and 43, an AND circuit 44, and word line border line 45.

The operation of the dot pattern writing address circuit will now be described taking, as an example, the writing of a font pattern at point Q (x, y) in FIG. 5.

When the heading address RA and the capacity RC of the destination space 25 are set in the registers 30 and 31 from the microprocessor 7 via the data bus signal lines 18a, the raster buffer 5' is allocated in the memory space in the microprocessor 7.

When the destination memory width MW in terms of the number of words per line is set in the register 33, and the destination address DA for addressing to a particular bit is set in the registers 32a and 32b, a DMA (direct memory access) circuit, not shown, in the dot pattern development section 15 operates, and the address signal lines and the control signal lines for reading a font pattern 22 from the source memory, e.g., the built-in font memory 4' are enabled.

Then, reading of a font pattern 22 shown in FIG. 5, with a source data width of L bits, and a source data height of H bits, is started. The reading of the font pattern 22 is performed a word at a time in the principal scanning direction. When one word of the font pattern that has been read is supplied into the dot pattern development section 15, the source data address signal lines and the control signal lines are disabled, and the one word of the dot pattern that has been supplied are subjected to bit-shifting. The number of bits by which shifting is performed is the deviation of the location where the font is to be allocated from the word boundary in the actual memory. This is because the particular bit of the point Q for developing the font pattern 22 in the destination space 25 is pointed.

When the bit shifting is completed, the outputs from the dot pattern writing address circuit of FIG. 6 enable the destination bit address signal lines, data signal lines, not shown, and the control signal lines, and one word of the font pattern having been bit-shifted is developed into the designated location in the destination space 25, and then the address signal lines, the data signal lines, and the control signal lines are disabled.

The above operations are successively repeated, and when the reading of the L-th bit in the principal scanning direction is completed, the L-th bit reading completion signal is output and after the development of the L-th bit, the operation then proceeds to the reading and development of the next raster, i.e., line, within the font pattern.

When the above operation is repeated, and the reading and development of the H-th line is completed, the reading of one character of the font pattern is completed, and the operation is terminated.

Now, the bit shift processing, switching to the next raster and the automatic coupling processing between the last address and the first address of the destination space 25 will be described. Here, the term "coupling processing is used to mean such a processing whereby part of font patterns that has overflown the tail end of the raster buffer are assigned to a head of the raster buffer such that part of the font pattern assigned to the head of the raster buffer and part of the font pattern assigned to the tail of the raster buffer form complete font patterns.

The output signal of the last (lowest) four bits indicating the bit position $(n-1)$ within the word (16 bits) in the registers 32a and 32b storing the destination bit address $(16 \cdot MW \cdot y + x)$ are applied to the input of the counter 42, and when the contents of the above-mentioned four bits are set in the counter by a counter load signal, not shown, the bit shifting of the font pattern (one word long) that has been supplied to the dot pattern development section 15 and the count-up operation of the counter 42 are performed synchronously until the carry-out signal of the counter 42 (word-boundary signal 45) is on, i.e., the font pattern data is shifted by $(15-(n-1))$ bits, and writing with n-bit shifting into the destination space 25 is now possible.

The font pattern development (writing) in the destination space 25 will now be described.

The heading address RA for positioning the destination space 25 in the actual memory is stored in the register 30, and the memory capacity RC is stored in the register 31. The heading address RA is set at a location designated by $2^n$ times $64 \times K$ ($n = 0, 1, 2 \ldots$), and the memory capacity RC is set to be $2^n$ times 64 Kbytes ($n = 0, 1, 2 \ldots$). The signals 46 of the upper 8 bits in the 23 bits are masked with information of the destination space 25 from the register 31. For instance, with the register 31 designating $64 \times K$ (00 Hex.) i.e., the space from the address $0 \times K$ to $64 \times K$, even when the signals 46 of the upper 8 bits of the destination address are accessing the space of 128 Kbytes (01 Hex.), i.e., the space from the address $64 \times K$ to the address $128 \times K$, the output lines 47 are kept at 00 Hex. by the action of the AND circuit 44, and the overflow from the $64 \times K$ space is prevented.

In other words, even if development of a font pattern from the $64 \times K$ space (the space from the address $0 \times K$ to the address $64 \times K$) to the $128 \times K$ space (the space from the address $64 \times K$ to the address $128 \times K$) occurs, the font pattern that has overflown is automatically stored staring with the head of the $64 \times K$ space (see point Q' (x', y') in FIG. 5).

The signals on the output lines 47 of the AND circuit 44 are added, at the adder 34, to the heading address RA of the register 30, and, using its output signals 48, the destination space 25 on the actual memory can be accessed.

The address designation and the development in the destination space will now be described.

The output lines (excepting the lower four bits connected to the counter 42) of the registers 32a and 32b in which the destination address is recorded are connected to the inputs of the selectors 37 and 38, and the destination address designated by the word becomes effective, and is stored in the registers 39 and 40 in the next stage.

The destination address stored in the registers 39 and 40 is loaded in the counters 41 and 43 responsive to the counter load signal, not shown, and address signals are output through the output lines (address but lines 18b) of the counters 41 and 43. As a result, the address designated by the word in which the point Q (x, y) in the destination space 25 is present is selected, and with the developed data after the above-mentioned n bit shifting, pointing and development (writing) of the designated address are enabled.

When the development of one word is completed, the next word in the principal scanning direction in the font pattern 22 is read, and the above-mentioned bit shifting is performed, the count values of the counters 41 and 43 are incremented by "1", the word next to the point Q (x, y) in the destination space 25 is developed.

The counters 41 and 43 are successively incremented by "1", so that the reading and development of the font pattern 22 in the principal scanning direction reaches the L-th bit, the L-th bit reading completion signal, not shown, is output from the source memory access circuit, and the selectors 37 and 38 are switched to select the inputs from the adders 35 and 36.

At the same time, the outputs of the register 33 storing the memory width MW in the principal scanning direction of the destination space 25 and of the register 40 in which the lower bit information of the destination address (DA) are set are added, and set in the register 40 via the selector 38. At the same time, the upper bit output information of the destination address (DA) and the register 39 and the carry signal of the adder 36 and the "0" data are added, and set in the register 39 via the selector 37.

Input to the counters 41 and 43 is the information newly set in the registers 39 and 40. The raster $((y+1)$-th raster) next to the point Q (x, y) set in the counter load signal, not shown, is pointed to. One word of the font pattern of the next raster $y+1$ that has been bit-shifted can then be developed.

When the development of one word is completed, starting with the next word, each time reading and development are performed, the counters 41 and 43 are incremented by "1", and the above-mentioned operation is repeated. The operation for the L bits in the principal scanning direction and the H bits in the auxiliary scanning direction is successively performed, and the development of one character of the font pattern 22 into the destination space 25 is thus completed.

Figure 7:
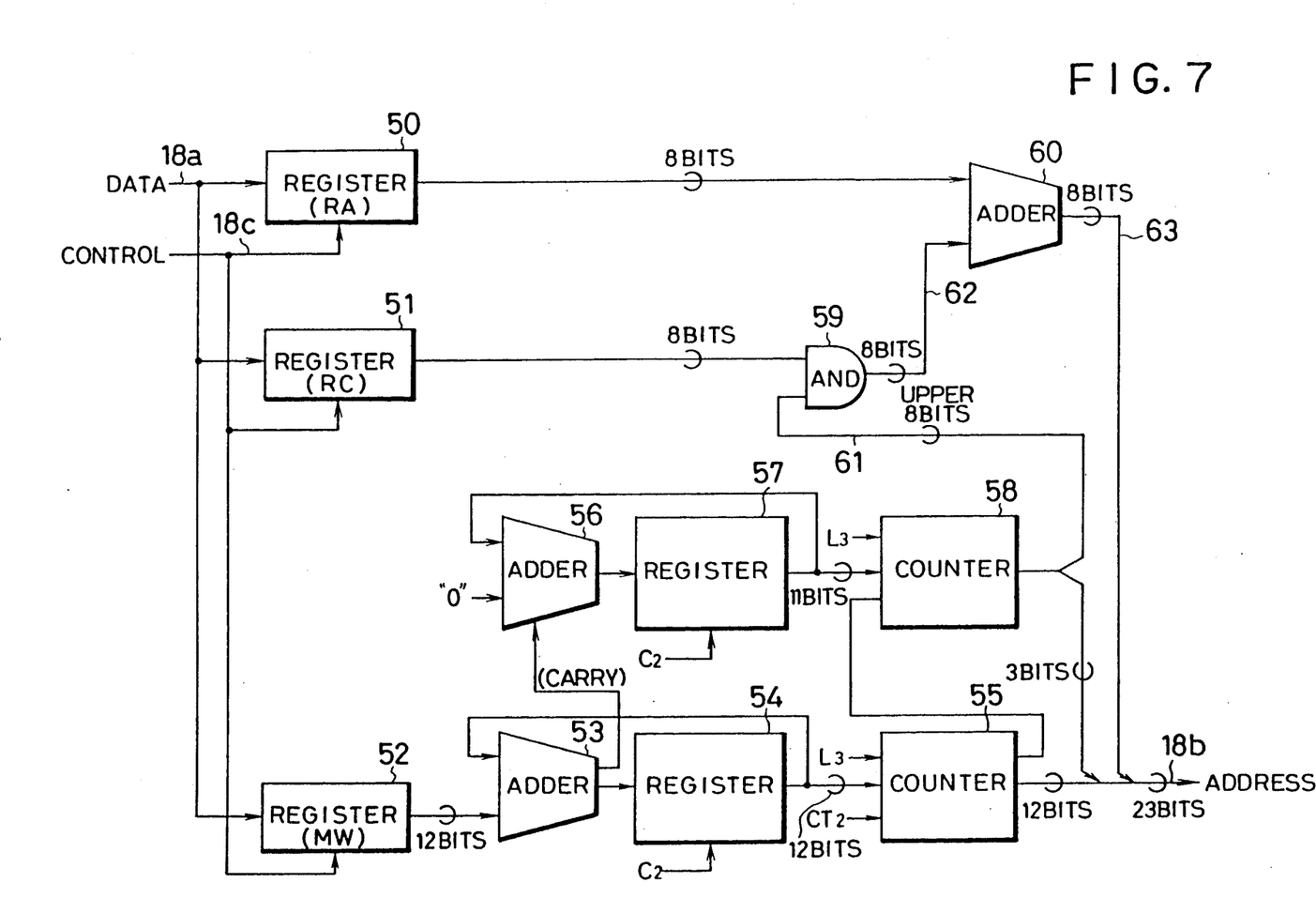
FIG. 7 is a diagram showing the dot pattern reading address circuit.

FIG. 7 shows a dot pattern reading address circuit.

As illustrated, it comprises a register 50 for storing the heading address RA, and a register 51 for storing the memory capacity of the destination space 25. A register 52 stores a memory width M in terms of the number of words, of the destination space 25 in the principal scanning direction. The data are set in these registers from the microprocessor 7 via the data bus 18a.

The heading address RA can be set at $2^n$ times $64 \times K$, and the memory capacity RC can be set at $2^n$ times 64 Kbytes. The signals 61 of the upper 8 bits in the 23 bits of the reading address signals to be described later are masked at the AND circuit 59 with the information of the destination space 25. For instance, with the register 51 designating 64 Kbytes (00 Hex.), i.e., a word within the range of from the address $0 \times K$ to the address $64 \times K$, even when the signals 61 of the upper 8 bits of the reading address are accessing the space of $128 \times K$ (01 Hex.), i.e., the space from the address $64 \times K$ to the address 128×K, the output lines 62 of the AND circuit 59 are kept at 00 Hex., and does not overflow the 64×K space. That is, in the event of the reading of a dot pattern exceeding the 64×K space, there will be automatic switching to the reading which start at the heading dot line in the 64×K space, and the reading is repeated to complete the reading of the entire information of the page.

The signals on the output lines 62 of the AND circuit 59 are added to the heading address RA from the register 50 at the adder 60, and its output signals 63 form the address 18b for the destination space 25 on the actual memory, enabling access.

Address designation and reading of the destination space 25 will not be described.

When the microprocessor 7 issues a dot pattern reading command, the registers 54 and 57 and the counters 55 and 58 are reset, and the reading of the dot pattern is performed a word at at the time starting with the heading address of the destination space 25.

Subsequently, when the successive MW word reading is performed in the principal scanning direction, responsive to the 1 raster reading signal, not shown, the output information of the register 54 and the memory width MW information are added at the adder 53, and new information is set in the register 54. The information in the register 57, the carry in the adder 53, and the "0" data are added to set new information in the register 57.

The heading address RA+MW for the next raster newly set are set in the counters 55 and 58, responsive to a counter load signal, not shown, and the reading is performed. The above operation is repeated to successively read data of the page.

Figure 8:
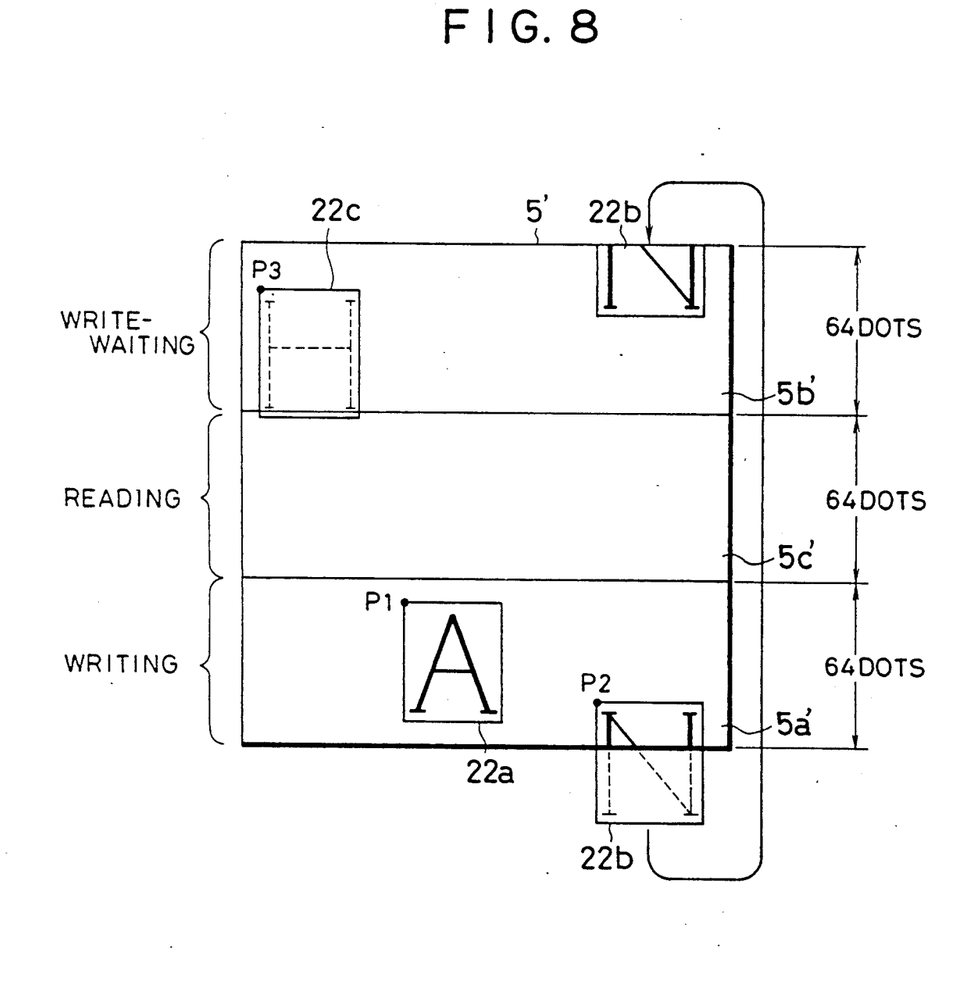
FIG. 8 is a diagram showing a raster buffer of the 3-layered configuration according to the invention.

FIG. 8 shows the 3-layered raster buffer.

In the auxiliary scanning direction, 1 layer is comprised of 64 bits, and the font patterns 22a, 22b, 22c are of 12 points (in the auxiliary scanning direction; 1/72×12×300=50<64 bits). When the font pattern 22a is pointed to the point P1 in the writing layer 5a'in the raster buffer 5', it is developed in the writing layer 5a'. When the font pattern 22b is pointed to the point P2, its part exceeds the writing layer 5a' and the raster buffer 5', and the exceeding part is developed in the write-waiting layer 5b'.

The reading of the dot pattern of the reading layer 5c' is commenced after development of the font pattern 22b is completed, and the development of the font pattern 22b is deferred until the definition of the layer 5b' is changed to a writing layer and the definition of the layer 5c' is changed to a write-waiting layer.

Figure 9:
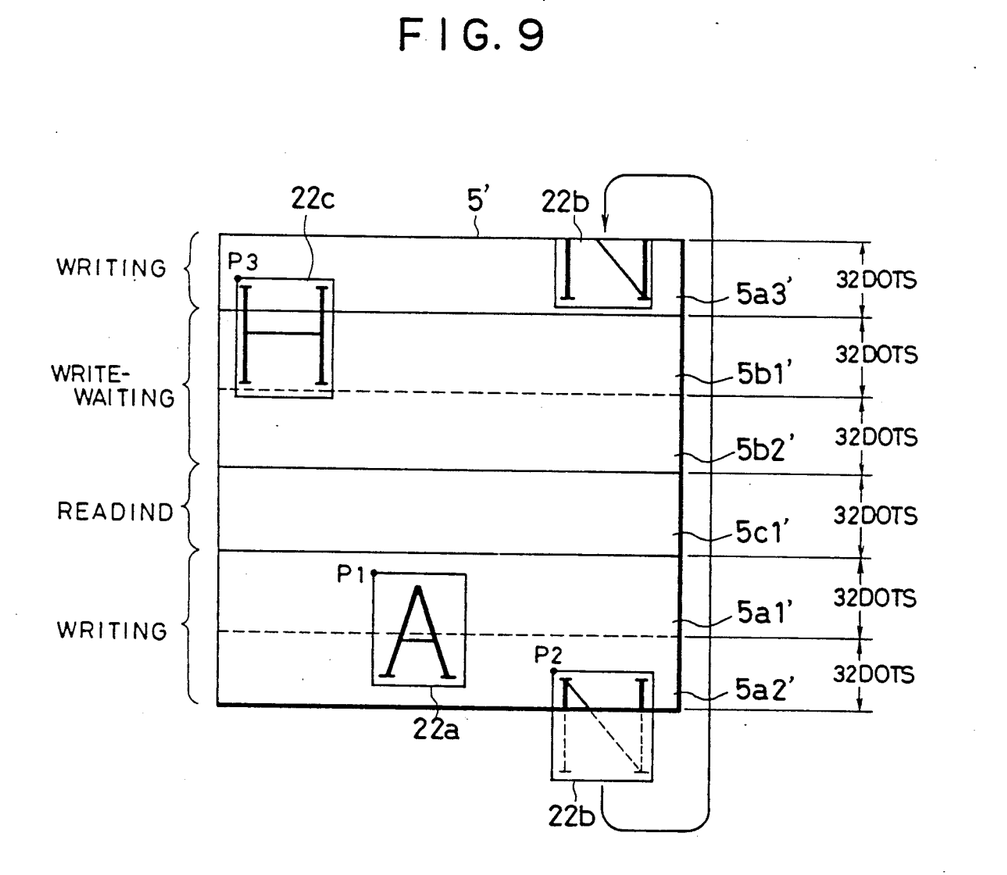
FIG. 9 is a diagram showing a raster buffer of the 6-layered configuration according to another embodiment of the invention.

FIG. 9 shows the 6-layered raster buffer.

In this case, the writing layer is formed of 3 layers (5a1' to 5a3') with the height of 32 dots in the auxiliary scanning direction, the write-waiting layer is formed of 2 layers (5b1' and 5b2') with the height of 32 dots in the auxiliary scanning direction, and the reading layer is formed of one layer (5c1') with the height of 32 dots in the auxiliary scanning direction. The total capacity of the 6 layered configuration is identical to that of the 3-layered configuration in FIG. 8.

When the font pattern 22a is pointed at the point P1 in the writing layer 5a1' of the raster buffer 5', it is developed in the writing layers 5a1' and 5a2'. When the font pattern 22b is pointed at the point P2 in the writing layer 5a2', part of the font pattern 22b is developed in the writing layer 5a2', and the rest exceeds the raster buffer 5'. The exceeding part of the font pattern is developed in the writing layer 5a3'. In the above described 3-layered configuration, when the pointing was made at the point P3, the development of the font pattern 22c was impossible. In the 6-layered configuration, because of the writing layer 5a3', it is possible to develop in the writing layer 5a3' and the write-waiting layers 5b1' and 5b2'. Moreover, the reading of dot pattern of the reading layer 5c1' is commenced after the development of the font pattern 22c is completed.

As has been described, in the case of the 6-layered configuration, reading in the direction of the auxiliary scanning direction, is made for a dot pattern of 32 dots (1 layer) can be made, as opposed to the 3-layered configuration, margin is provided in the development (writing), so overrun does not occur.

The invention is not limited to the embodiments described above. Various modifications are possible without departing from the scope of the invention.

As has been described, according to the invention, the raster buffer for storing dot image data are divided into three layers in the direction of auxiliary scanning, and the respective layers are assigned to a writing layer in which a font pattern read from a font memory is written, a reading layer from which dot image data that have been written are read, and a write-waiting layer in which part of font pattern that has overflown the writing layer is written, and the writing layer and the write-waiting layer have a capacity for storing a character having the biggest size among those which are used frequently, and prior to printing of dot image data, a font pattern is written in the writing layer, and the definition of the layer in which writing has been made is changed to a reading layer, dot image data is then read from the reading layer, the definition of the write-waiting layer waiting for the next writing is changed to a writing layer, and the definition of the reading layer from which the reading has been made is changed to a writing layer, with such change of definition being made successively. As a result, the required memory capacity is reduced, and the cost of the apparatus can be lowered.

Moreover, when the font pattern exceeds the border at the tail of the raster buffer, the exceeding part is written at the head of the raster buffer, with continuity. As a result, the printing speed can be increased even where complicated patterns or a multiplicity of character patterns are concentrated in a specific area.

What is claimed is:

1. A method of operating a raster buffer for storing dot image data in a printing apparatus comprising the steps of:

dividing the raster buffer into three layers in a scanning direction by assigning the respective layers as a writing layer in which a font pattern read from a font memory is written, a reading layer from which dot image data that have been written are read, and a write-waiting layer in which a font pattern that has overflowed the writing layer is written, wherein the writing layer and the write-waiting layer have a storage capacity for storing a character having a biggest size among those characters which are used frequently; and prior to printing of dot image data, writing a font pattern from the font memory in the writing layer, reassigning the writing layer containing the font pattern as a reading layer, reading dot image data from the reading layer, reassigning the write-waiting layer as a writing layer, and reassigning the reading layer from which the reading has been performed as a write-waiting layer, the reassigning being performed successively.

2. The raster buffer operating method of claim 1, wherein the raster buffer memory having the writing layer, the reading layer, and the write-waiting layer is divided in storage capacity equally among the three layers.

3. The raster buffer operating method of claim 1, wherein the writing layer is divided into a plurality of sections.

4. The raster buffer operating method of claim 3, wherein the writing layer is divided into three sections.

5. The raster buffer operating method of claim 1, wherein the write-waiting layer is divided into a plurality of sections.

6. The raster buffer operating method of claim 5, wherein the write-waiting layer is divided into two sections.

7. The raster buffer operating method of claim 3, wherein the sections of the writing layers have identical storage capacity.

8. The raster buffer operating method of claim 4, wherein the sections of the writing layers have identical storage capacity.

9. The raster buffer operating method of claim 5, wherein the sections of the write-waiting layer have identical storage capacity.

10. The raster buffer operating method of claim 6, wherein the sections of the write-waiting layer have identical storage capacity.

11. In a printing apparatus, an arrangement comprising:
a raster buffer for storing font patterns in a dot image data form;
means for reading font patterns from a font memory and writing the font patterns in the raster buffer; and
address control means for controlling, during writing of the font patterns in the raster buffer, allocation of respective dots of the font patterns to respective memory locations in the raster buffer from a head end to a tail end of the raster buffer, said address controlling means assigning respective dots of a part of a font pattern that has overflowed the tail end of the raster buffer, to a head of the raster buffer such that a part of the font pattern is assigned to the head of the raster buffer and a part of the font pattern is assigned to the tail of the raster buffer, the parts forming a complete font pattern.

12. The arrangement according to claim 11, wherein the raster buffer is part of a memory which is also used for purposes other than that of the raster buffer, and has a capacity which is $2^m$ bytes, with m being a positive integer, said address controlling means further comprising:
generating means for generating mask bits;
address means for producing a writing address; and
masking means for using the mask bits to set upper bits of the writing address to a value of 0, at least one of said upper bits of the writing address having a value of 1 when the writing address is greater than or equal to $2^m$ plus an address of the head end of the raster buffer.

13. The arrangement according to claim 12, wherein said address of the head end of the raster buffer is $2^n$, with n being a positive integer, said address control means further comprising:
storage means for storing the address of the head end of the raster buffer; and
an adder for adding the output of the masking means to the address of the head address of the raster buffer.

14. The arrangement according to claim 11, further comprising means for reading the font patterns from the raster buffer and supplying the font patterns to a printing section.

* * * * *